United States Patent
Yang et al.

(10) Patent No.: US 10,474,651 B2
(45) Date of Patent: Nov. 12, 2019

(54) ANALYSIS OF SYSTEM INFORMATION

(71) Applicants: Wei-Shan Yang, Shanghai (CN); Guoping Peng, Shanghai (CN); Irwan Halim, Houston, TX (US); Hewlett-Packard Development Company, L.P., Houston, TX (US)

(72) Inventors: Wei-Shan Yang, Shanghai (CN); Guoping Peng, Shanghai (CN); Irwan Halim, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 189 days.

(21) Appl. No.: 15/500,650

(22) PCT Filed: Jul. 31, 2014

(86) PCT No.: PCT/CN2014/083405
§ 371 (c)(1),
(2) Date: Jan. 31, 2017

(87) PCT Pub. No.: WO2016/015276
PCT Pub. Date: Feb. 4, 2016

(65) Prior Publication Data
US 2017/0220611 A1    Aug. 3, 2017

(51) Int. Cl.
*G06F 7/02*    (2006.01)
*G06F 16/00*    (2019.01)
(Continued)

(52) U.S. Cl.
CPC .......... *G06F 16/22* (2019.01); *G06F 11/366* (2013.01); *G06F 16/248* (2019.01); *G06F 16/285* (2019.01)

(58) Field of Classification Search
CPC ........ G06F 17/30554; G06F 17/30312; G06F 17/30598; G06F 11/366; G06F 17/40; G06F 17/30; G06F 11/008; G06F 11/3656; G06F 11/3664; G06F 2201/84; G06F 11/0703; G06F 16/248; G06F 16/22; G06F 16/285; G06F 16/00
See application file for complete search history.

(56) References Cited

U.S. PATENT DOCUMENTS 8,069,374 B2  11/2011  Panigrahy et al.
8,560,826 B2  10/2013  Wu et al.
(Continued)

FOREIGN PATENT DOCUMENTS

CN  101079758 A  11/2007
CN  102521331 A  6/2012
(Continued)

OTHER PUBLICATIONS

HP Insight Diagnostide Online Edition Featuring Survey Utility and IML Viewer, Jun. 2004, pp. 1-12, White Paper, Hewlett-Packard Development Company, L.P.

*Primary Examiner* — Bruce M Moser
(74) *Attorney, Agent, or Firm* — HPI Patent Department

(57) ABSTRACT

Analysis of system information includes retrieving selected snapshots comprising the system information to be analyzed. Further, one or more operations can be performed on the system information to extract resultant information. The resultant information can be provided over a graphical user interface to a user.

15 Claims, 6 Drawing Sheets

(51) Int. Cl.
  *G06F 16/22*   (2019.01)
  *G06F 16/248*  (2019.01)
  *G06F 16/28*   (2019.01)
  *G06F 11/36*   (2006.01)

(56) References Cited

U.S. PATENT DOCUMENTS

| | | |
|---|---|---|
| 2004/0177226 A1 | 9/2004 | Chen |
| 2004/0267836 A1 | 12/2004 | Armangau et al. |
| 2008/0168311 A1* | 7/2008 | Pietrek ............... G06F 11/3664 714/33 |
| 2012/0265959 A1 | 10/2012 | Le et al. |
| 2013/0219156 A1* | 8/2013 | Sears ............... G06Q 10/06375 713/1 |
| 2014/0040669 A1 | 2/2014 | Davis et al. |
| 2015/0052400 A1* | 2/2015 | Garrett ............... G06F 11/3656 714/37 |
| 2018/0232278 A1* | 8/2018 | Kumarasamy ...... G06F 11/1458 |

FOREIGN PATENT DOCUMENTS

| | | |
|---|---|---|
| CN | 102929878 A | 2/2013 |
| JP | 2009080803 A | 4/2009 |

\* cited by examiner

ANALYSIS OF SYSTEM INFORMATION

BACKGROUND

System information can include data that is used or generated by a computing system while the computing system is in operation. For example, system information can include runtime data, file system data, application data, operating system data, file data, path information, and various metadata. The application data and the operating system data can also include respective settings. Analysis of system information can be used for troubleshooting, performance enhancement, monitoring usage, and other purposes.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1A:
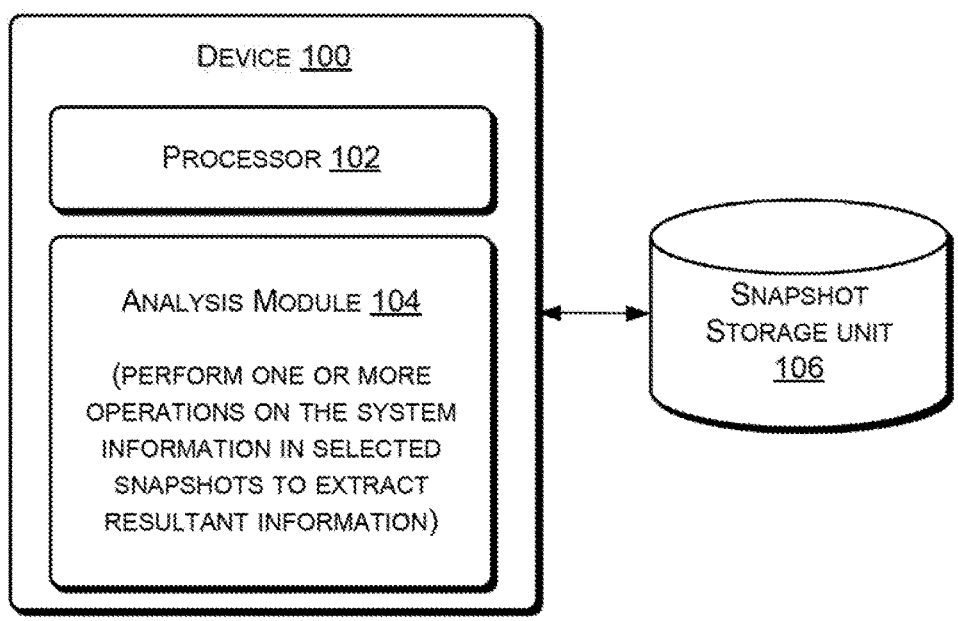
FIG. 1a illustrates a computing device for analysis of system information, according to an example of the present subject matter.

Generally, analysis of system information is performed based on a line-by-line comparison of system information obtained from a small set of computing systems, such as a line-by-line comparison of system information of two or three computing systems. It also involves substantial manual effort and can be time consuming.

The present subject matter relates to devices and methods for analysis of system information, System information of a computing system can include, but is not limited to, data of the computing system, path information of the data, and metadata of the data. As used herein, a computing system can refer to, for example, a server, a workstation, a laptop, a mobile device, an embedded system, an electronic control unit, and the like.

Data in the system information can relate to, for example, runtime data, file system data, application data with settings, operating system data with settings, file data, and the like. For example, data can include application registry value pairs, settings file, database content, etc. Path information can include pointers, for example, registry keys path, file path, database name, column name, index, process name, memory address, and the like, which point to where the data resides. The path information is used by the computing system to find and access the data. Metadata can include attributes or properties of the data and can be used to identify the data to be accessed. For example, metadata can include the version string in an executable file, security settings in registry, process name for the data, and other properties of the data.

Analysis of system information can be used, for example, to determine reasons for differences in performance between different computing systems or of a computing system at different points in time. Based on the analysis, various actions for troubleshooting, performance enhancement, or other purposes may be taken. For example, if an application runs on a computing system but fails on another computing system, the reason for the difference in performance may be determined by an analysis of the system information of the two systems. In another example, if a computing system fails after an application has been executed a few times, system information before and after the failure of the computing system may be analyzed to determine the cause for the failure.

According to example implementations of the present subject matter, devices and methods for analysis of system information are described. The described methods and devices can allow comparison of system information of a plurality of computing systems and can also allow performing algebraic set operations for analysis of system information to filter out or extract differences. The differences thus determined can then be reported to users.

In one implementation, snapshots may be taken for each computing system under consideration. A snapshot indicates a state of the computing system at a particular point in time and includes the system information reflecting the state of the computing system at that particular point in time. Once a snapshot is taken, it can be stored, for example, in a storage unit, and later used for analysis of the system information. In one implementation, the snapshots may be taken periodically based on, for example, a specified schedule or the occurrence of an event. In one example, snapshots may be taken daily or once a week or once a month or at any other specified time interval. In another example, a snapshot may be taken when an event, such as installation of a new application or modification of an existing application or system failure, occurs.

In one implementation, snapshots of a plurality of computing systems are selected from a storage unit for analysis. For example, the selected snapshots may correspond to snapshots of a first set of computing systems on which an application failed to install and snapshots of a second set of computing systems on which the application could be installed successfully. Further, the selected snapshots may include snapshots of the first and second set of computing systems before and after the attempted installation of the application. In another example, the selected snapshots may include snapshots of a set of computing systems before and after a system failure occurred.

The system information in the selected snapshots may be analyzed using operations, such as algebraic set operations. In one implementation, a user may define expressions including one or more operations, such as intersection, union, complement, difference, etc., to be performed on the system information in the selected snapshots. The described devices and methods can perform the operations to filter and extract differences between the selected snapshots and obtain resultant information, such as differential information, for further actions, such as troubleshooting. Thus, the described devices and methods can substantially reduce the effort and time involved in the analysis of system information.

The above mentioned devices and methods are further described below with reference to figures. It should be noted that the description and figures merely illustrate the principles of the present subject matter along with examples described herein and, should not be construed as a limitation to the present subject matter. It is thus understood that various, arrangements may be devised that, although not explicitly described or shown herein, embody the principles of the present subject matter. Moreover, all statements herein reciting principles, aspects, and specific examples thereof, are intended to encompass equivalents thereof.

FIG. 1a illustrates a computing device 100 for analysis of system information, according to an example of the present subject matter. The computing device 100 may be implemented as, but is not limited to, a server, a workstation, a desktop computer, a computer, a laptop, a mobile device, or other such computing devices. The computing device 100 is interchangeably referred to as device 100 hereinafter.

In an example implementation, the device 10 may include processor(s) 102. The processor(s) 102 may be implemented as microprocessors, microcomputers, microcontrollers, digital signal processors, central processing units, state machines, logic circuitries, and/or any devices that manipulate signals based on operational instructions. Among other capabilities, the processor(s) 102 may fetch and execute computer-readable instructions stored in a memory. The functions of the various elements shown in the figure, including any functional blocks labeled as "processor(s)", may be provided through the use of dedicated hardware as well as hardware capable of executing machine readable instructions.

The device 100 can further include an analysis module 104 for analysis of system information. The analysis module 104 can be coupled to the processor 102. In one implementation, the analysis module 104 can be implemented as a hardware or firmware module. In another implementation, the analysis module 104 may be implemented as machine-readable instructions.

The device 100 can communicate with a snapshot storage unit 106, also referred to as storage unit 106 hereinafter. While the storage unit 106 is shown external to the device 100, it will be appreciated that in different implementations the storage unit 106 may be partly or fully implemented in the device 100. Further, while not shown herein, the storage unit 106, when implemented externally, may be in communication with the device 100 either directly or over a network.

The storage unit 106 can be implemented as a database, such as a relational database, a hierarchical database, a distributed database, a cloud database, or the like. The storage unit 106 can store snapshots of a plurality of computing systems taken at various points in time, as discussed in detail below. Further, the snapshots stored in the storage unit 106 may be indexed and ordered based on, for example, the computing system to which they correspond, the time at which they were taken, etc., for faster retrieval.

In operation, the analysis module 104 can receive user inputs including a selection of snapshots that comprise system information to be analyzed and one or more expressions, each expression comprising one or more operations to be performed on the system information. The operations to be performed can include algebraic set operations. Based on the user inputs, the analysis module 104 can retrieve the snapshots from the storage unit 106 and can perform the one or more operations on the system information to extract resultant information from the system information. The resultant information can be then presented to a user for further decision making and taking appropriate action as discussed below.

Figure 1B:
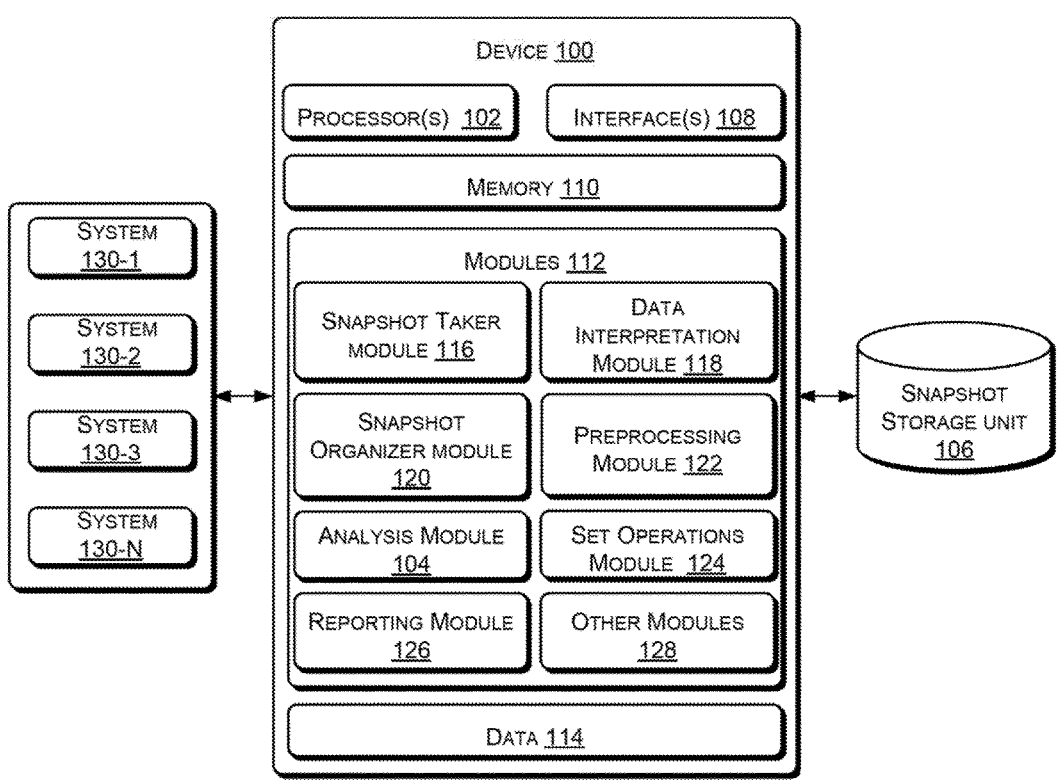
FIG. 1b illustrates in detail a computing device for analysis of system information, according to an example of the present subject matter.

FIG. 1b illustrates in detail a computing device 100 for analysis of system information implemented in a computing environment, according to an example of the present subject matter.

As shown in FIG. 1b, the device 100 also includes interface(s) 108. The interface(s) 108 may include a variety of machine readable instructions-based interfaces and hardware interfaces that allow the computing device 100 to communicate with other computing devices, web servers, external repositories or storage devices, network devices, such as switches and routers, peripheral devices, such as touch screen displays, display screens, keyboards, and mouse, and various computing systems.

Further, the computing device 100 includes memory 110, coupled to the processor(s) 102. The memory 110 may include any non-transitory computer-readable medium including, for example, volatile memory (e.g., RAM), and/or non-volatile memory (e.g., EPROM, flash memory, etc.).

The computing device 100 also includes module(s) 112 and data 114. The module(s) 112 may be coupled to the processor(s) 102. The module(s) 112, amongst other things, include routines, programs, objects, components, data structures, and the like, which perform particular tasks or implement particular abstract data types. The data 114 serves, amongst other things, as a repository or a storage device for storing data that may be fetched, processed, received, or generated by the module(s) 112, including the snapshots from the storage unit 106. Although the data 114 is shown internal to the computing device 100, it may be understood that the data 114 can reside in an external storage device, which may be coupled to the computing device 100.

In an example implementation, the module(s) 112 of the computing device 100 may include, apart from the analysis module 104, a snapshot taker module 116, a data interpretation module 118, a snapshot organizer module 120, a preprocessing module 122, a set operations module 124, a reporting module 126, and other module(s) 128. The other module(s) 128 may include programs or coded instructions that supplement applications and functions, for example, programs in the operating system of the computing device 100.

Further, the device 100 can communicate with a plurality of computing systems, such as system 130-1, 130-2, . . . 130-n, collectively referred to as systems 130 and individually as system 130. For ease of description, a subset of systems 130 is also referred to as systems 130 herein.

The following description describes an example device 100 implementing analysis of system information, in accordance with the present subject matter. It would be understood that the described examples and implementation are for the purpose of explanation, and shall not be construed as specific implementation of the present subject matter.

In one example implementation, the device 100 may obtain a plurality of snapshots of one or more of the systems 130 and may store the plurality of snapshots in the storage unit 106. A snapshot of a system 130 indicates a state of the system 130 at a particular point in time and includes the system information reflecting the state of the computing system at that particular point in time. For example, the system information can include information about registry, files, applications, operating system, etc. For taking snapshots of one or more of the systems 130, the snapshot taker module 116 may receive instructions from a user, for example, through a graphical user interface (GUI).

In one implementation, the user may define rules based on which the snapshots may be taken by the snapshot taker module 116. For example, snapshots may be taken daily or once a week or once a month or at any other specified time interval. In another example, a snapshot of a system 130 may be taken when an event, such as installation of a new application or modification of an existing application or system failure, occurs. In yet another implementation, the user may select to take a snapshot at a current time.

For taking the snapshots, the snapshot taker module 116 may provide instructions, which may include the user defined rules, to a client snapshot module (not shown in the fig.) present in each of the systems 130. Each client snapshot module can take a snapshot of the respective system 130 as per the received instructions and can send the snapshot to the snapshot taker module 116 for further processing.

In one implementation, the snapshot taker module 116 can use the data interpretation module 118 to interpret data, for example, by understanding the data structure, in the system information in the received snapshots for subsequent processing. The data interpretation module 118 can help to interpret various different data formats, for example, file system formats, such as FAT, NTFS, memory usage formats, audio file formats, such as MP3, WAV, OGG, image file formats, such as JPG, PNG, BMP, audio-video (AV) file formats, such as MP4, MPG, MP2, database formats, such as SQL, Access, etc. The data interpretation module 118 can also add metadata in the system information based on the data interpretation.

In one example, the data interpretation module 118 can include or interface with data plugins (not shown in the fig.) corresponding to different data types or file formats to interpret the data supported by the respective plugin. Each of the plugins can parse the supported data, if present in the system information of a snapshot, and provide it in a standardized form with additional metadata so that it can be understood, for example, by the preprocessing module 122 and the analysis module 104. Accordingly, the data interpretation module 118 can use the plugins to ensure that the preprocessing module 122 and the analysis module 104 know what to compare and how to compare the system information.

For example, registry data plugin, file system plugin, database plugin, hardware data plugin, audio file plugin, video file plugin, AV file plugin, etc., may be used. The registry data plugin may assist the data interpretation module 118 to read the registry data from the snapshot, for example, by translating registry path, security description; value-data pair to a format understandable by subsequent processes. The file system plug-in can interpret different file system types and can be used to determine whether, for example, the metadata will include file name, file property, security information and file content or hash of file content. Similarly, an SQL database plugin may translate a database snapshot into connection name, table path, data type, data etc; while a memory plugin may understand the data structure inside a random access memory (RAM) dump, and identify section as well as stack information and other memory information. The audio file plugin can assist in interpretation of sound wave, frequency, etc., and the image file plugin can assist in pattern recognition, color differential interpretation, etc.

Accordingly, when a new data type or data source is to be supported, a plugin for interpreting the new data type may be interfaced with the data interpretation module 118, thus making it easily extendible.

The snapshot organizer module 120 can then store the snapshots in the storage unit 106, for example, based on the date and time of snapshot, the system 130 for which the snapshot was taken, data types in the snapshot, etc. In one example, prior to storing the snapshots in the storage unit 106, the snapshots may be additionally processed by the preprocessing module 122 for indexing and to help faster retrieval and analysis. The preprocessing module 122 may further normalize the data and metadata, for example, using standard format across data types, and may assign indices for indexed storage. In one example, data may be further normalized by standardizing a path of each data source, standardizing properties, such as date, time, security description, and extension properties, with standard format, making data content hash in standard format, etc.

In one example, the preprocessing module 122 may also add metadata to the system information so that the performance of the analysis module 104 can be improved. For example, when snapshots of SQL databases are preprocessed, for each snapshot, the tables may be indexed and a count of table contents may be determined and added as metadata by the preprocessing module 122. Accordingly, when analyzing system information in the snapshots, the analysis module 104 can use the preprocessed table counts to compare the snapshots and produce the resultant information much faster and with lesser use of device resources.

In operation, for analyzing the system information in a set of snapshots, a user can select the snapshots from the storage unit 106 through a GUI provided by the analysis module 104. The analysis module 104 can then retrieve the selected snapshots from the storage unit 106. Additionally, through the GUI, the user can provide an expression comprising one or more operations, such as algebraic set operations, to be performed on the system information in the selected snapshots to obtain resultant information. In one example, the user may provide a series of expressions, each expression including one or more operations to be performed.

The analysis module 104 can receive the expression and can perform the one or more operations on the system information in the selected snapshots to obtain the resultant information. For example, the resultant information can include the differential information, i.e., information which is different between the selected snapshots. This differential information can be indicative of the changes that occurred in the data or metadata and that caused the difference in performance between the computing systems.

For performing the one or more operations, the analysis module 104 can use the set operations module 124, which can manage rules of the operations. For example, the set operations module 124 can include definitions and rules of execution for each set operation, such as intersection, union, difference, complement, etc., based on which the corresponding set operation may be performed as per the expression provided by the user. In another example, the set operations module 124 can include or interface with plugins that correspond to different set operations. Accordingly, new plugins may be easily defined and used for new set operations.

In one example, the analysis module 104 can perform the operations on metadata objects in the system information. Metadata objects refer to a collection of instantiated data, path and metadata of a particular data type in the system information and can be used as a single set of objects for set operations. The metadata objects also include instantiation of the additional metadata added by the data interpretation module 118 or the preprocessing module 122 as discussed above. For example, the additional metadata for an audio file can have a sound wave signature, peak frequency, lambda, etc. For an image file, the additional metadata can include color count, object outlining, pattern signature, etc. For a file system, metadata object can include path, selective properties, file data hash, etc.

In one example, when algebraic set operations are performed on the metadata objects, it can be determined if a metadata object is the same or different from another metadata object, based on the rules of the operations. In one example, the metadata objects may be created by the preprocessing module 122 when the snapshot is stored in the storage unit 106. In another example, the metadata objects may be created after a snapshot is retrieved by the analysis module 104, for example, in case it was not created earlier.

In one implementation, the set operations module 124 can help in performing following example algebraic set operations upon metadata objects in the system information of selected snapshots, say A and B:

Intersection (A∩B): result set is those metadata objects that are shared between the metadata objects of A and B;
Union (A∪B): result set is collection of the metadata objects of A and B;
Complement (\A): result set is those metadata objects of B that are not part of the metadata objects of A;
Difference (A∩B\(A∪B)): result set is those metadata objects that are unique to A or B;
Inverse (~A): result set excludes the metadata object of A, based on a complete set defined by operational context by user.

Similarly, other operations may also be defined. The resultant information can thus be understood as the result set of metadata objects obtained after performing the one or more operations as per the expression provided by the user. While the example algebraic set operations defined above have been defined using two snapshots A and B, it will be understood that similar and additional definitions can be created for a plurality of snapshots as per operation rules. Thus, using operation rules, the system information of a plurality of snapshots, for example, of five snapshots or more, can also be analyzed with minimal manual effort and in an efficient manner. Moreover, the resultant information can be obtained more accurately and precisely as compared to manual analysis.

On completion of the analysis, the analysis module 104 can provide the resultant information to the reporting module 126. The reporting module 126 can provide the resultant information to a user, for example, by displaying on a GUI. The reporting module 126 can further categorize the result into multiple groups, for example, data modified by the Operating System, data modified by a specified application, etc., when displaying it. The reporting module 126 can also allow the user to interact with the result, for example, to refine the result by categorizing or filtering the resultant information, choose a different rule, re-compare, create a patch based on the result, etc. For example, after analyzing the selected snapshots as per a first expression, in case another or an additional analysis is to be performed, the user can provide a second expression and can have a second analysis performed easily, rather than re-comparing the system information in a line-by-line manner.

In one implementation, the reporting module 126 can create a package or a group of files that contains the result of the analysis, a patch if created by the user, affected files, registry entries, and/or other suspected data. A patch can be understood as a module or application for debugging the identified issues, and can be for example, executable code. The package can be stored in the storage unit 106 and sent to other computing systems where a similar patch is to be installed or similar troubleshooting is to be done, thereby substantially reducing the time and efforts involved.

Figure 2:
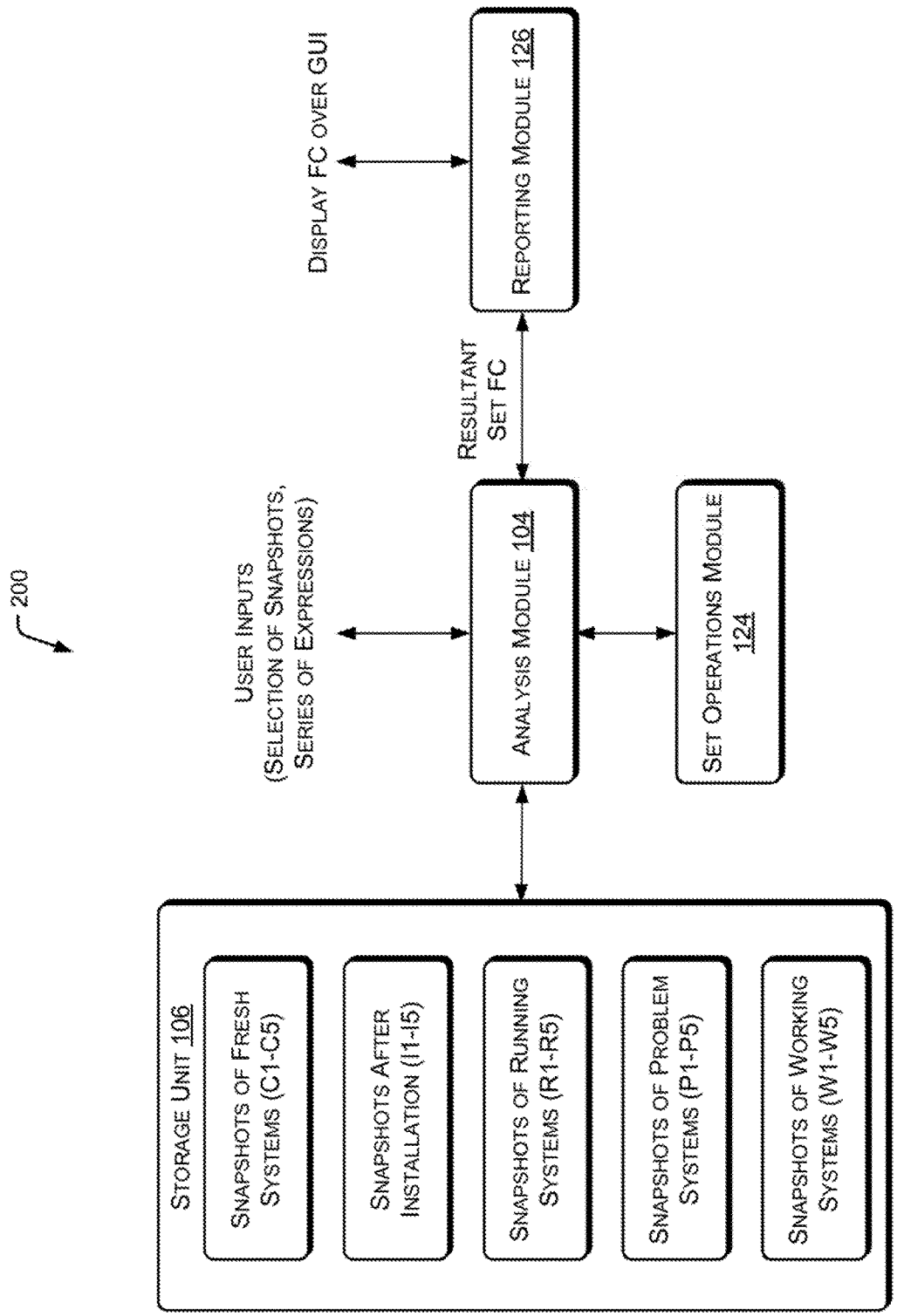
FIG. 2 illustrates an example scenario in which a computing device for analysis of system information can be implemented, according to an example of the present subject matter.

FIG. 2 illustrates an example scenario 200 in which a computing device for analysis of system information can be implemented, according to an example of the present subject matter. It will be understood that the example scenario 200 is provided for understanding the present subject matter and is not to be construed as limiting in any way. Other example scenarios and implementations can be derived based on the present subject matter and are intended to be included in the scope of the present subject matter.

Consider a case where a user has a number of fresh computing systems (C) and installs an application, such as an anti-virus application, on the computing systems (I). The user then observes that the application failed to load on the 30% of the systems (N) but was running on the other 70% of the systems (R). In another 30% of the systems (P), the application failed to load after a month of usage, while the rest of the systems (W) were still running without any issues. In order to efficiently find the root cause of the application not loading, the user can use the device 100 to capture one or more snapshots for each different stage of the computing systems and analyze the system information as per the present subject matter.

In one example, the user may capture five snapshots for each stage, each snapshot corresponding to one of five computing systems. By using a plurality of snapshots for each stage, the static and non-relevant information can be effectively filtered out and the resultant information thus obtained can be more accurate and precise. While the user may use one or more snapshots for each stage without limitation, the present description is provided based on five snapshots as an example implementation for illustrative purposes.

In the present example, the first stage can be the fresh computing systems out of the box (C1-C5). Second stage can be those computing systems right after the application was installed (I1-I5). Third stage can be for those running computing systems with the software running (R1-R5). Fourth stage can be for those problem computing systems that exhibit the issue after a month (P1-P5). Last stage can be for those working computing systems that are still running the application without issues (W1-W5).

Accordingly, the user can provide instructions to the snapshot taker module 116 to obtain the snapshots (C1-C5), (I1-I5), (R1-R5), (P1-P5), and (W1-W5) at the different points in time as discussed above. In another implementation, the snapshots may have been obtained for all the computing systems at different stages based on the occurrence of an event, such as installation of the application or failure to load. Further, the snapshot organizer module 120 can organize and store the obtained snapshots in the storage unit 106, with or without preprocessing, as discussed above.

In operation, the user can provide inputs to the analysis module 104 to select the snapshots (C1-C5), (I1-I5), (R1-R5), (P1-P5), and (W1-W5) for analysis of system information. Further, the user can provide an expression (Exp) including one or more operations, such as algebraic set operations, to the analysis module 104 for analyzing the system information in the elected snapshots.

In the current example scenario 200, the user may provide a series of expressions to obtain the final resultant information, including the files locations or registry settings location where the issue is, for troubleshooting.

For example, first the irrelevant changes (pCC) may be obtained by extracting the changes that are not constant in the fresh computing systems (C1-C5) as follows:

complete system information set (iC)
=C1∪C2∪C3∪C4∪C5     Exp 1 constant system information set (xC)
=C1∩C2∩C3∩C4∩C5     Exp 2 irrelevant changes (pCC)=xC\iC     Exp 3 or in terms of regular mathematical operation, it can be represented as irrelevant changes (pCC)=iC−xC Then, a first problem set (PC1) may be obtained by obtaining information from the first problematic system (P1) and removing the information that exists on a system that never failed (W1), a system that has the software running (R1), and a system with the software just installed (I1); and further removing the irrelevant changes (pCC) determined above. Thus, first problem set (PC1)=pCC\((W1∪R1∪I1)\P1)     Exp 4(1)

or in terms of regular mathematical operation, it can be represented as first problem set (PC1)=P1−(W1+R1+I1)−pCC Similarly, a problem set can be generated for each sample as:

second problem set (PC2)=pCC\((W2∪R2∪I2)\P2)     Exp 4(2)

third problem set (PC3)=pCC\((W3∪R3∪I3)\P3)     Exp 4(3)

fourth problem set (PC4)=pCC\((W4∪R4∪I4)\P4)     Exp 4(4)

fifth problem set (PC5)=pCC\((W5∪R5∪I5)\P5)     Exp 4(5)

These problem sets PC1-PC5 provide resultant information for each of the systems P1-P5 that can possibly be the issue. To further identify the issue more accurately, the information common to the five problem sets can be obtained as the final resultant information as follows:

final resultant set (FC)=PC1∩PC2∩PC3∩PC4∩PC5     Exp 5

Thus, to obtain the final resultant set FC, the user can specify the series of expressions including Exp 1, 2, 3, 4(1)-4(5), and 5 to the analysis module 104. The analysis module 104 can accordingly perform the operations, as per the series of expressions, on the system information in the selected snapshots to extract the final resultant set FC. To perform the operations, the analysis module 104 can apply the rules defined in the set operations module 124 as discussed above. Further, the reporting module 126 can display the final resultant set FC over a GUI. The reporting module 126 may also receive user instructions for refining the final resultant set FC, for example, by categorizing the information in the final resultant set FC.

In one example, the reporting module 126 can create a report package, which includes the affected files, settings, and other information. The report package can be then used by the user to create a patch, i.e., a code to debug the issue, and can reproduce the issue and verify whether the patch fixes it. Further, the report package along with the patch can also be sent to other computing systems having similar issues for debugging.

While the above example has been provided in the context of debugging or troubleshooting, it will be understood that the devices and methods of the present subject matter can, be used for other purposes as well, such as for performance enhancement and monitoring changes caused by use of different applications.

Figure 3A:
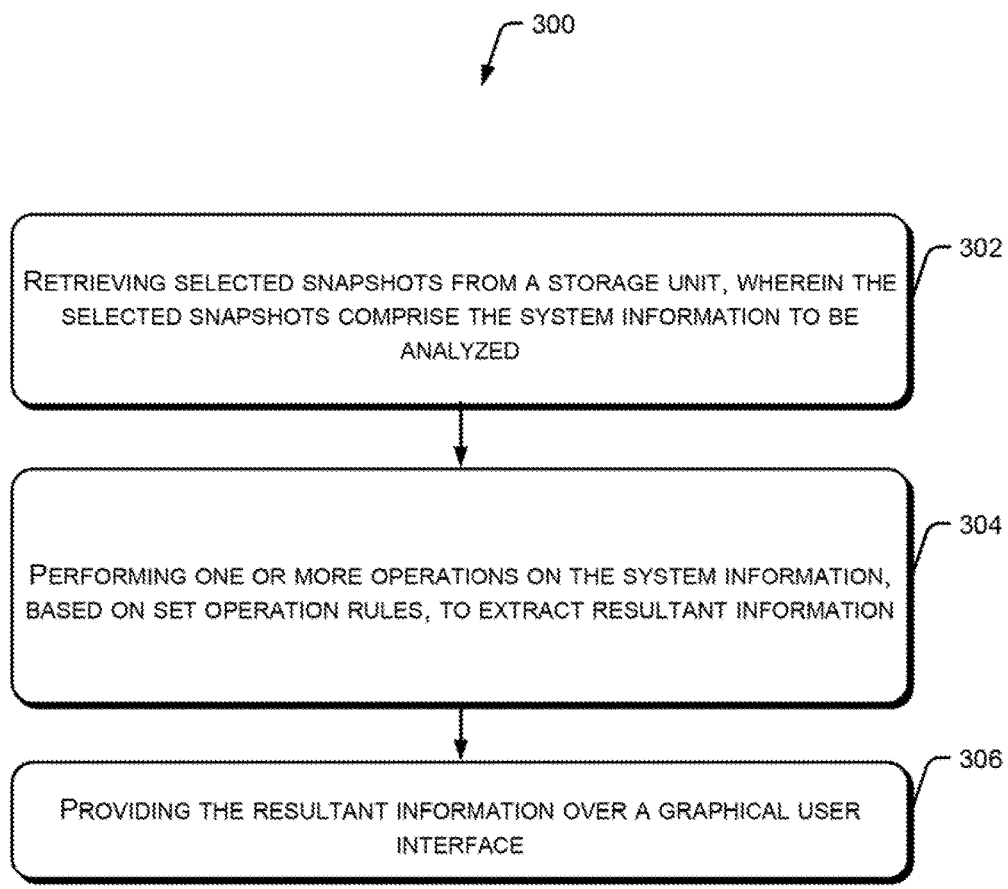
FIG. 3a illustrates a method for analysis of system information, according to an example of the present subject matter.
Figure 3B:
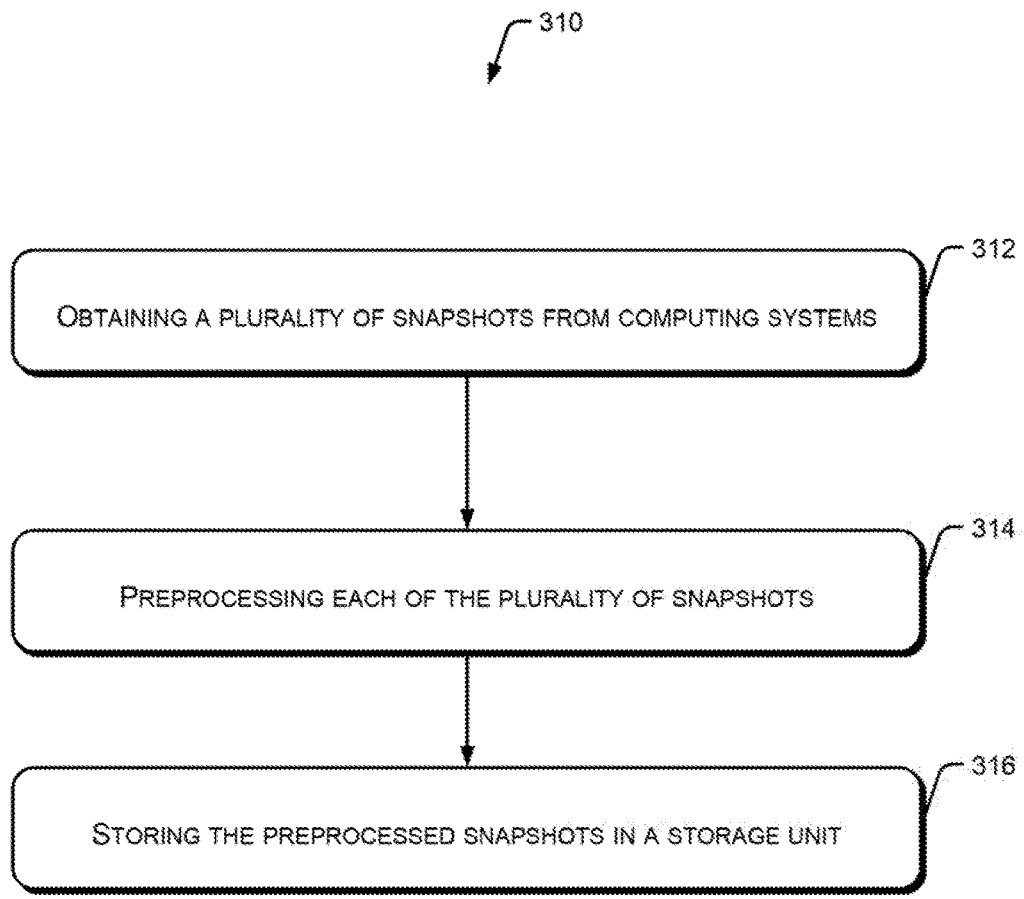
FIG. 3b illustrates a method for capturing and storing system information, according to an example of the present subject matter.

FIG. 3a illustrates method 300 for analysis of system information and FIG. 3b illustrates method 310 for capturing and storing system information, according to examples of the present subject matter. The order in which the methods 300 and 310 are described is not intended to be construed as a limitation, and any number of the described method blocks may be combined in any order to implement the methods 300 and 310, or alternative methods. Furthermore, the methods 300 and 310 may be implemented by processor(s) or computing device(s) through any suitable hardware, non-transitory machine readable instructions, or combination thereof.

It may be understood that steps of the methods 300 and 310 may be performed by programmed computing devices. The steps of the methods 300 and 310 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media.

Further, although the methods 300 and 310 may be implemented in a variety of computing devices; in implementations described with reference to FIGS. 3a and 3b, the methods 300 and 310 are explained in context of the aforementioned computing device 100, for ease of explanation.

Referring to FIG. 3a, in an example implementation of the present subject matter, at block 302, selected snapshots are retrieved from a storage unit. The selected snapshots include the system information to be analyzed. The system information can include data, path information, and metadata. For example, the analysis module 104 may retrieve the selected snapshots from the storage unit 106 based on user inputs.

At block 304, one or more operations, such as algebraic set operations, are performed on the system information, based on set operation rules, to extract resultant information. For example, the algebraic set operations can be selected from intersection, union, complement, difference, and inverse operations. In one implementation, the analysis module 104 may perform the one or more algebraic set operations based on rules defined in the set operations module 124. In one example, the one or more operations may be specified by a user in an expression. In one implementation, the user may provide a series of expressions, each expression including a subset of the one or more operations. Accordingly, the one or more operations may be performed on the system information based on the series of expressions.

At block 306, the resultant information is provided over a graphical user interface to a user. In one example, the resultant information may be refined based on user instructions, for example, by categorizing and filtering the resultant information. For example, the reporting module 126 may provide the resultant information. Further, a package or a group of files that contains the result of the analysis, a patch if created by the user, affected files, registry entries, and/or other suspected data, may be generated, for example, by the reporting module 126. The package can be stored in the storage unit 106 and sent to other computing systems for which similar analysis is to be performed.

Referring to FIG. 3b, in an example implementation of the present subject matter, at block 312, a plurality of snapshots may be obtained from computing systems. Each snapshot may correspond to a state of a respective computing system at a particular point in time and may include system information of the computing system at that point in time. For example, the snapshot taker module 116 may obtain the snapshots either directly or from a client snapshot taker module installed on each of the computing systems. The snapshot taker module 116 may use the data interpretation module 118 for interpreting the data in the snapshots.

At block 314, each of the plurality of snapshots may be preprocessed, for example, to normalize metadata and add indices. For example, the preprocessing module 122 may preprocess the snapshots.

At block 316, the preprocessed snapshots may be stored in a storage unit. For example, the snapshot organizer module 120 may organize and store the snapshots in the storage unit 106 for subsequent retrieval.

Figure 4:
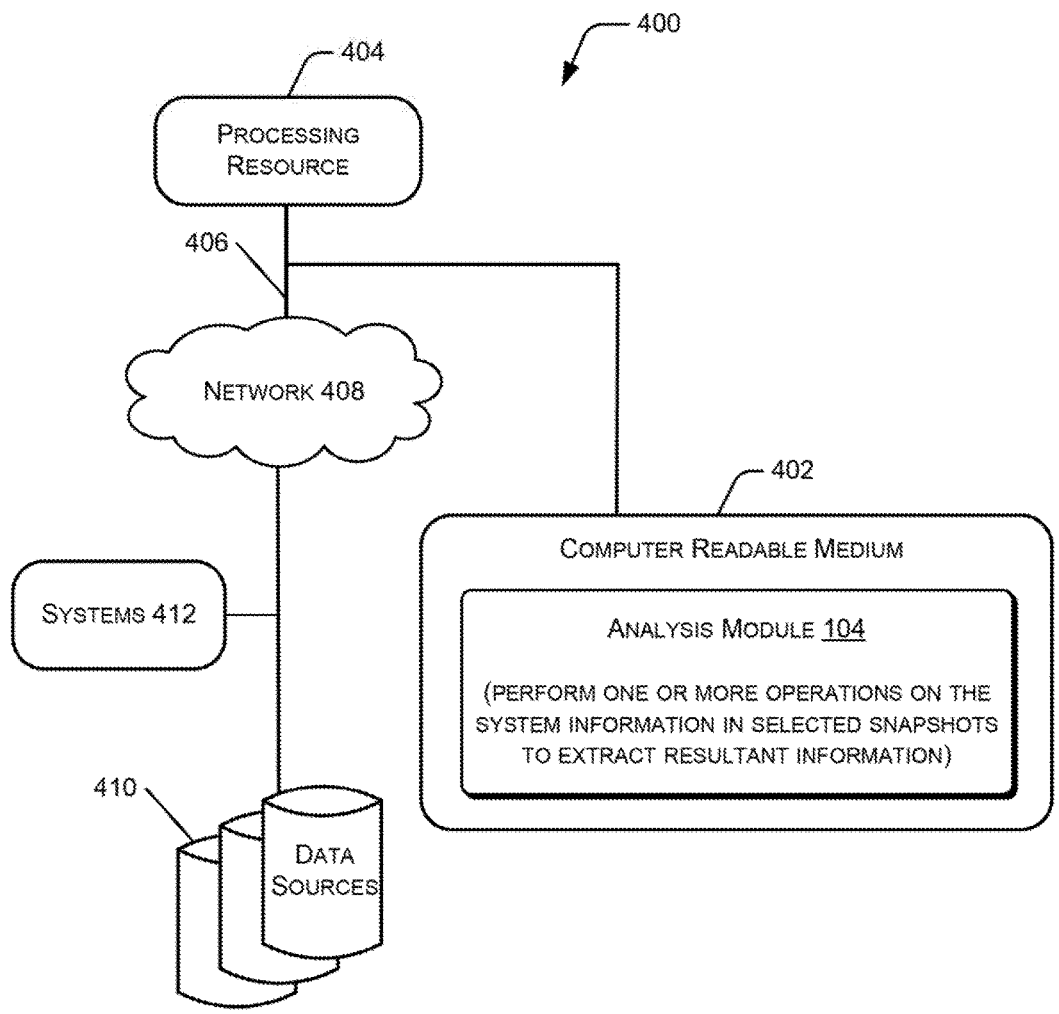
FIG. 4 illustrates an example computing environment, implementing a non-transitory computer-readable medium for analysis of system information, according to an example of the present subject matter.

FIG. 4 illustrates an example computing environment 400, implementing a non-transitory computer-readable medium 402 for analysis of system information, according to an example of the present subject matter.

In one implementation, the non-transitory computer readable medium 402 may be utilized by a computing device, such as the computing device 100 (not shown). The computing device 100 may be implemented in a public networking environment or a private networking environment. In one implementation, the computing environment 400 may include a processing resource 404, such as the processor 102, communicatively coupled to the non-transitory computer readable medium 402 through a communication link 406.

The computer readable medium 402 may be, for example, an internal memory device or an external memory device. In one implementation, the communication link 406 may be a direct communication link, such as any memory read/write interface. In another implementation, the communication link 406 may be an indirect communication link, such as a network interface. In such a case, the processing resource 404 may access the computer readable medium 402 through a network 408. The network 408 may be a single network or a combination of multiple networks and may use a variety of different communication protocols.

The processing resource 404 and the computer readable medium 402 may also be communicating with various data sources 410, such as the storage unit 106, and computing systems 412, such as the systems 130, over the network 408. In one implementation, the computer readable medium 402 includes a set of computer readable instructions, such as instructions corresponding to functionalities provided by the analysis module 104. Additionally, the computer readable medium 402 may also include instructions corresponding to functionalities provided by one or more of the snapshot taker module 116, the data interpretation module 118, the snapshot organizer module 120, the preprocessing module 122, the set operations module 124, and the reporting module 126. The set of computer readable instructions may be accessed by the processing resource 404 through the communication link 406 and subsequently executed.

For example, the processing resource 404 may execute the instructions to retrieve selected snapshots comprising the system information to be analyzed. Further, the processing resource 404 may perform one or more operations, such as algebraic set operations, on the system information, based on an expression received from a user, to extract resultant information. For performing the one or more operations may include algebraic set operations, such as intersection, union, complement, difference, and inverse, and the instructions can include set operation rules.

The resultant information thus obtained can be provided over a graphical user interface to the user. The resultant information may be further refined based on user instructions, for example, by categorizing and filtering the resultant information.

In one example, the instructions can also be executed by the processing resource 404 to obtain a plurality of snapshots from computing systems 412, preprocess the plurality of snapshots to normalize metadata and add indices. The preprocessed snapshots can be then stored in a storage unit, such as the data sources 410 for subsequent retrieval.

Although implementations of analysis of system information have been described in language specific to structural features and/or methods, it is to be understood that the present subject matter is not necessarily limited to the specific features or methods described. Rather, the specific features and methods are disclosed and explained in the context of a few implementations for computing devices.

The invention claimed is:

1. A computing device comprising:
   a processor; and
   a non-transitory machine-readable storage medium, communicatively coupled to the processor, storing instructions executable by the processor to:
      receive user inputs designating:
         a selection of snapshots of system information, and
         an expression defining an operation to be performed on data of the snapshots to identify and filter out system information differences, among the snapshots, irrelevant to a performance issue based on a stage of a computing system corresponding to each of the snapshots;
      retrieve the selected snapshots from a snapshot storage unit; and
      perform the operation to filter out the irrelevant system information differences in the selected snapshots and extract resultant information including system information differences, among the snapshots, relevant to the performance issue.

2. The computing device of claim 1, further comprising instructions executable by the processor to define rules for performing the operation.

3. The computing device of claim 1, wherein the operation includes at least one of intersection, union, complement, difference, and inverse.

4. The computing device of claim 1, further comprising instructions executable by the processor to:
   obtain the snapshots from corresponding computing systems based on user instructions; and
   organize and store the snapshots in the snapshot storage unit.

5. The computing device of claim 4, further comprising instructions executable by the processor to process the snapshots, wherein the processing includes normalizing metadata and adding indices for storing in the snapshot storage unit.

6. The computing device of claim 4, further comprising instructions executable by the processor to interpret the data in the snapshots for organizing the snapshots in the snapshot storage unit.

7. The computing device of claim 1, further comprising instructions executable by the processor to provide the resultant information over a graphical user interface.

8. A method comprising:
retrieving, from a snapshot storage unit, selected snapshots captured from computing systems, wherein the selected snapshots comprise system information of the computing systems to be analyzed and metadata added to the selected snapshots;
receiving an expression defining an operation to identify and filter out system information differences, among the snapshots, irrelevant to a performance issue based on a stage of a computing system corresponding to each of the snapshots;
performing the operation on the metadata added to the selected snapshots to filter out the irrelevant system information differences included in the selected snapshots and to extract resultant information including system differences, among the snapshots, relevant to the performance issue utilizable to resolve the performance issue of a computing system of the computing systems; and
providing the resultant information over a graphical user interface.

9. The method of claim 8, further comprising refining the resultant information based on user instructions, wherein the refining includes categorizing and filtering the resultant information.

10. The method of claim 8, further comprising:
obtaining the snapshots from computing systems;
preprocessing each of the snapshots, wherein preprocessing includes standardizing different data types across the snapshots and adding the metadata to the snapshots; and
storing the preprocessed snapshots in the snapshot storage unit.

11. The method of claim 8, wherein the system information comprises data, path information, and metadata.

12. The method of claim 8 comprising receiving a series of expressions, each expression including a subset of the operation, and performing the operation on the metadata based on the series of expressions.

13. A non-transitory computer-readable medium comprising instructions executable by a processing resource to:
retrieve selected snapshots, captured from a computing system, comprising system information of the computing system to be analyzed;
receive, from a user, an expression defining an operation to identify and filter out system information differences, among the snapshots, irrelevant to a performance issue based on a stage of the computing system corresponding to each of the snapshots relative to an occurrence of a performance issue;
perform the operation by applying a problem set, derived from the operation, to data of the snapshots based on the stage of the computing system corresponding each of the snapshots to filter out the irrelevant system information differences and to extract resultant information including system differences, among the snapshots, relevant to the performance issue utilizable to identify and resolve the performance issue; and
provide the resultant information over a graphical user interface to the user.

14. The non-transitory computer-readable medium of claim 13, wherein the problem set includes at least one of intersection, union, complement, difference, and inverse.

15. The non-transitory computer-readable medium of claim 13, wherein the instructions are further executable by the processing resource to:
obtain a plurality of snapshots from computing systems;
preprocess the plurality of snapshots to normalize metadata and add indices; and
store the preprocessed snapshots in a snapshot storage unit.

* * * * *